March 20, 1945.  J. L. HEROLD ET AL  2,371,993
CLUTCH DEVICE
Filed July 7, 1939
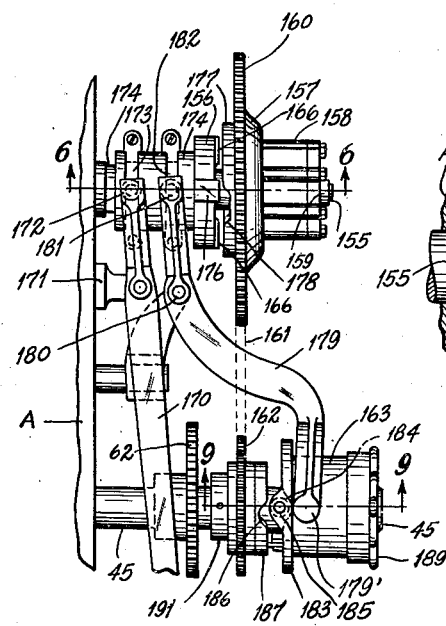
Fig.1.
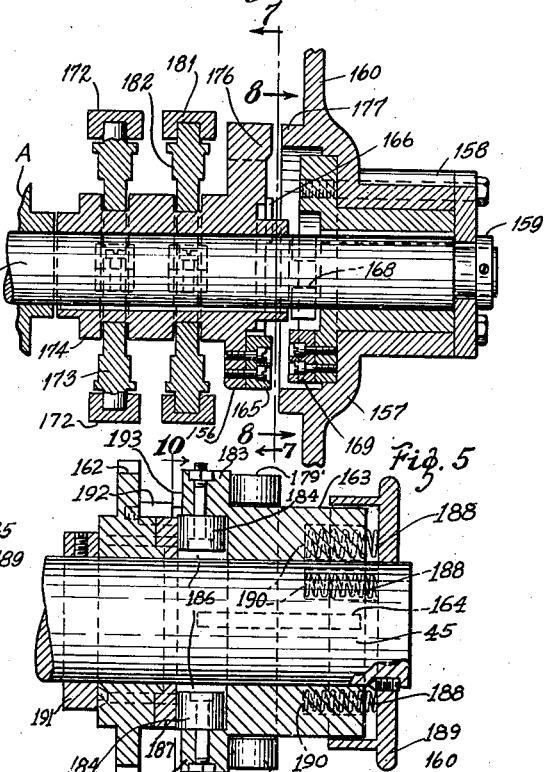
Fig.2.
Fig.5.
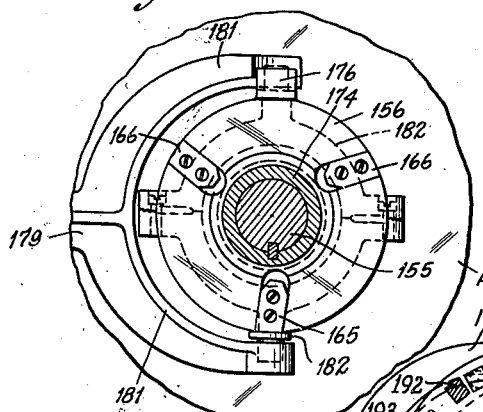
Fig.3.
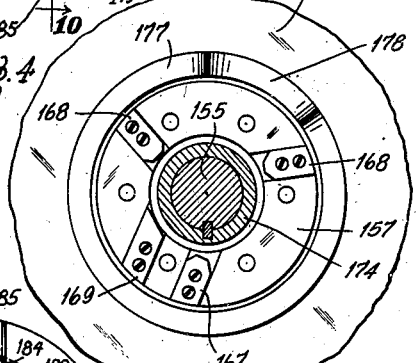
Fig.4.
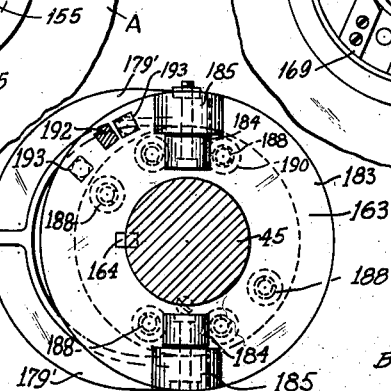
Fig.6.
INVENTORS:
J. L. HEROLD,
F. W. WEHMILLER,
By Albert J. McCauley
ATTORNEY.

Patented Mar. 20, 1945

2,371,993

UNITED STATES PATENT OFFICE 2,371,993

CLUTCH DEVICE

James L. Herold, St. Louis, and Frederick W. Wehmiller, Ladue, Mo., assignors to Barry-Wehmiller Machinery Company, St. Louis, Mo., a corporation of Missouri Application July 7, 1939, Serial No. 283,144

1 Claim. (Cl. 192—67)

This invention relates to clutch devices and is a continuation in part of our co-pending application, Serial No. 216,316, filed June 28, 1938, for Loading devices.

Various kinds of machines, including pasteurizers for bottled liquids, as well as other machines for handling bottles or other articles, are provided with endless carriers having separated receptacles movable to transmit rows of articles through the machines. In a machine of this kind, it is frequently desirable to operate the carrier independently of the loading device, and to thereafter continue the loading operation in synchronism with the movements of the carrier.

One of the objects of this invention is to produce a simple operating means whereby a loading device, or other machine unit, can be stopped at any time, independently of the carrier, or other machine unit, and thereafter started through the medium of a synchronizing device which establishes the cooperative relationship necessary for subsequent operations.

Fig. 1 is a top view of the clutch device through which power is transmitted.

Fig. 2 is an enlarged section on the line 6—6 of Fig. 1.

Fig. 3 is a section on the line 7—7 in Fig. 2 looking in the direction indicated by arrows 7.

Fig. 4 is a section on the same line in Fig. 2 looking in the direction indicated by arrows 8.

Fig. 5 is an enlarged section on the line 9—9 in Fig. 1.

Fig. 6 is a section on the line 10—10 in Fig. 5 looking in the direction indicated by arrows 10.

Without pointing out specific details of cooperative machine units, we will refer to the drawing which includes a shaft 155 to drive one of the machine units, and a shaft 45 to operate a second companion unit, said shaft 45 being provided with a wheel 62 for transmission of power to the second unit. The shaft 155 is provided with a driving clutch member 156 (Figures 1 and 2) slidably secured to the shaft 155, and a driven clutch member 157 loosely supported on the shaft 155, said driven clutch member having a hub 158 secured to a reduced portion of the shaft 155 by a collar 159 to prevent longitudinal displacement of the driven clutch member 157 on said shaft.

The driven clutch member 157 is provided with an integral sprocket wheel 160 adapted to transmit power through a chain 161, shown by dotted lines in Fig. 1, to a sprocket wheel 162 rotatably mounted on the operating shaft 45, said sprocket wheel 162 being adapted to transmit power to the operating shaft 45 through a driven member 163 slidably secured to said shaft by a key 164 as shown in Figure 5.

The driving clutch member 156 on the shaft 155 is provided with driving abutments or teeth 165 and 166 adapted to engage abutments or teeth 167 and 168 on the driven clutch member 157. The teeth on the driving and driven clutch members are so arranged that when the driving tooth 165 is located between the driven tooth 167 and an abutment 169 on the clutch member 157, the various driven elements of one machine unit will be synchronized with the other machine unit. The driving tooth 165 upon entering the space between the abutment 169 and driven tooth 167 provides a positive interlock of the clutch members to positively prevent displacement and insures the desired synchronizing effect. As an illustration of a means for shifting said driving clutch member, we have shown a lever 170 pivotally secured to a support 171 on the side wall A of a housing, said lever being provided at one end with a bifurcated portion 172 pivotally mounted on a split wheel 173 loosely supported in an annular groove in a hub 174 of the driving clutch member 156. The lever 170 is movable to shift the driving teeth of clutch member 156 into and out of driving engagement with the teeth of the driven clutch member.

To prevent driving engagement of the clutch teeth on the driving and driven clutch members until the desired operative relationship of the machine units is established, the clutch members 156 and 157 are provided with means for predetermining the position of said clutch members so that the clutch tooth 165 may be selectively shifted into driving engagement with the driven tooth 167. Said means includes a guide member 176 on the driving clutch member 156, and an abutment flange 177 on the other clutch member 157 adapted to engage said guide member 176 to prevent driving engagement of the clutch teeth. The abutment flange 177 is provided with a recess 178 adapted to receive the guide member 176 and permit driving engagement of the clutch teeth 165 and 167 when the required relationship is established.

In event of an overload on the operating shaft 45, the teeth of the driving clutch member 156 are automatically disengaged from the teeth on the driven clutch member 157 to stop the supply of power to the operating shaft 45.

The means for automatically disengaging the teeth of the clutch members includes a lever 179 pivotally supported at 180, said lever being provided at one end with a bifurcated portion 181 pivotally mounted on a split wheel 182 loosely supported in an annular groove in the hub 174 of the slidable driving clutch member 156. The other end of the lever 179 is provided with a bifurcated portion 179' extending partially around the driven member 163 on the shaft 45, and adapted to be engaged by an annular flange 183 on the driven member 163 in response to an overload on the operating shaft 45.

The driven member 163 is provided with rollers 184 rotatably supported on extended ears 185 of the driven member. The rollers 184 are normally held in recesses 186 in a hub 187 of the sprocket wheel 162 by springs 188 interposed between a hub 189 fixed to the end of the operating shaft 45 and spring seats 190 in the driven member, as shown in Figure 5.

While the rollers 184 are held in the recesses 186 power is transmitted from the sprocket wheel 162 through its hub 187 to the slidable driven member 163 and operating shaft 45. However, whenever there is an obstruction to the rotation of the operating shaft and the driven member 163, the hub 187 of the sprocket wheel 162 will continue to turn, and the cam or inclined walls of the recess 186 will cooperate with the rollers 184 to shift the driven member 163 longitudinally of the shaft from a normal position shown in Fig. 5 to a position shown in Fig. 1. A collar 191 on the shaft 45 prevents shifting of the hub 187 of the sprocket wheel.

As the driven member 163 moves to the position shown in Figure 1, the annular flange 183 thereon engages the bifurcated portion 179' of the lever 179 to swing said lever on its pivot, thereby moving the driving clutch member 156 to disengage its teeth from the teeth on the driven clutch member 157 and stop the transmission of power to the operating shaft 45.

To prevent the rollers 184 from entirely leaving the horizontal plane of the inclined walls of the recesses 186, an abutment 192 carried by the sprocket wheel 162 is adapted to cooperate with stop members 193 on the annular flange 183 of the driven member 163, as shown in Figures 5 and 6 to limit the rotation of the sprocket wheel 162 independently of the driven member 163.

We claim:

In a device for synchronizing machine units, a clutch through which power is transmitted to one of said machine units, said clutch including a constantly rotating driving clutch member having a plurality of driving clutch teeth, a driven clutch member having a plurality of clutch teeth adapted to engage said driving clutch teeth to transmit power to the last mentioned machine unit, one of said clutch members being provided with spaced abutment members, the other clutch member having a tooth adapted to be located between and interlocked with said abutment members when the machine units are synchronized with each other, and means for preventing the transmission of power from one clutch member to the other except when the last mentioned tooth is located between said abutment members, said means comprising a guide member on one of said clutch members, and an abutment flange rigidly united with the other clutch member adapted to engage said guide member to prevent the transmission of power from one clutch member to the other when the machine units are not synchronized with each other, said abutment flange being provided with a recess to receive said guide member and permit said last mentioned tooth to move into interlocked relationship with said abutment members when the machine units are synchronized with each other.

JAMES L. HEROLD.
FREDERICK W. WEHMILLER.